United States Patent [19]

Urbani

[11] Patent Number: 4,647,383

[45] Date of Patent: Mar. 3, 1987

[54] APPARATUS AND METHOD FOR PROCESSING SEWAGE SCUM

[75] Inventor: William G. Urbani, Stockton, Calif.

[73] Assignee: Industrial Innovations, Inc., Stockton, Calif.

[21] Appl. No.: 736,629

[22] Filed: May 20, 1985

[51] Int. Cl.$^4$ ............................................. C02F 1/02
[52] U.S. Cl. .................................. 210/768; 210/770; 210/776; 210/180; 210/182; 210/188
[58] Field of Search ................................. 210/768–770, 210/774, 771, 608, 703, 710, 776, 180–182, 179, 242.3, 806, 188

[56] References Cited

U.S. PATENT DOCUMENTS

| | | | |
|---|---|---|---|
| 3,122,528 | 2/1964 | Hanesworth, Jr. | 210/776 |
| 3,617,539 | 11/1971 | Grutsch | 210/776 |
| 4,248,709 | 2/1981 | Irving | 210/769 |
| 4,276,115 | 6/1981 | Greenfield et al. | 210/771 |
| 4,321,150 | 3/1982 | McMullen | 210/769 |
| 4,321,151 | 3/1982 | McMullen | 210/769 |

Primary Examiner—Benoit Castel
Attorney, Agent, or Firm—Townsend and Townsend

[57] ABSTRACT

A method and apparatus for reclaiming fats and oils from sewage scum includes a scum cooker, a solids separation system, a vacuum dryer, a condenser and product storage tanks. The scum cooker liquifies and renders sewage scum obtained from a sewage treatment plant by maintaining the raw sewage scum at an elevated temperature and an elevated pressure to sterilize and separate the scum into the solid, aqueous, and oily components. The solid separation system removes the solid and particulate matter from the liquified scum for disposal, preferably after washing the solids with treated water from the sewage treatment plant. The solid-free liquified scum is then transferred to the vacuum dryer which is maintained at an elevated temperature and preferably at least a moderate vacuum to remove the water and other volatiles from the liquified scum. These volatile components are condensed in the condenser for retreatment in the vacuum dryer or return to the sewage treatment plant to be processed with the remainder of the sewage. The oily components of the liquified sewage scum collected in the vacuum dryer are stored in a storage tank which is heated to make the oily substances flowable.

16 Claims, 1 Drawing Figure

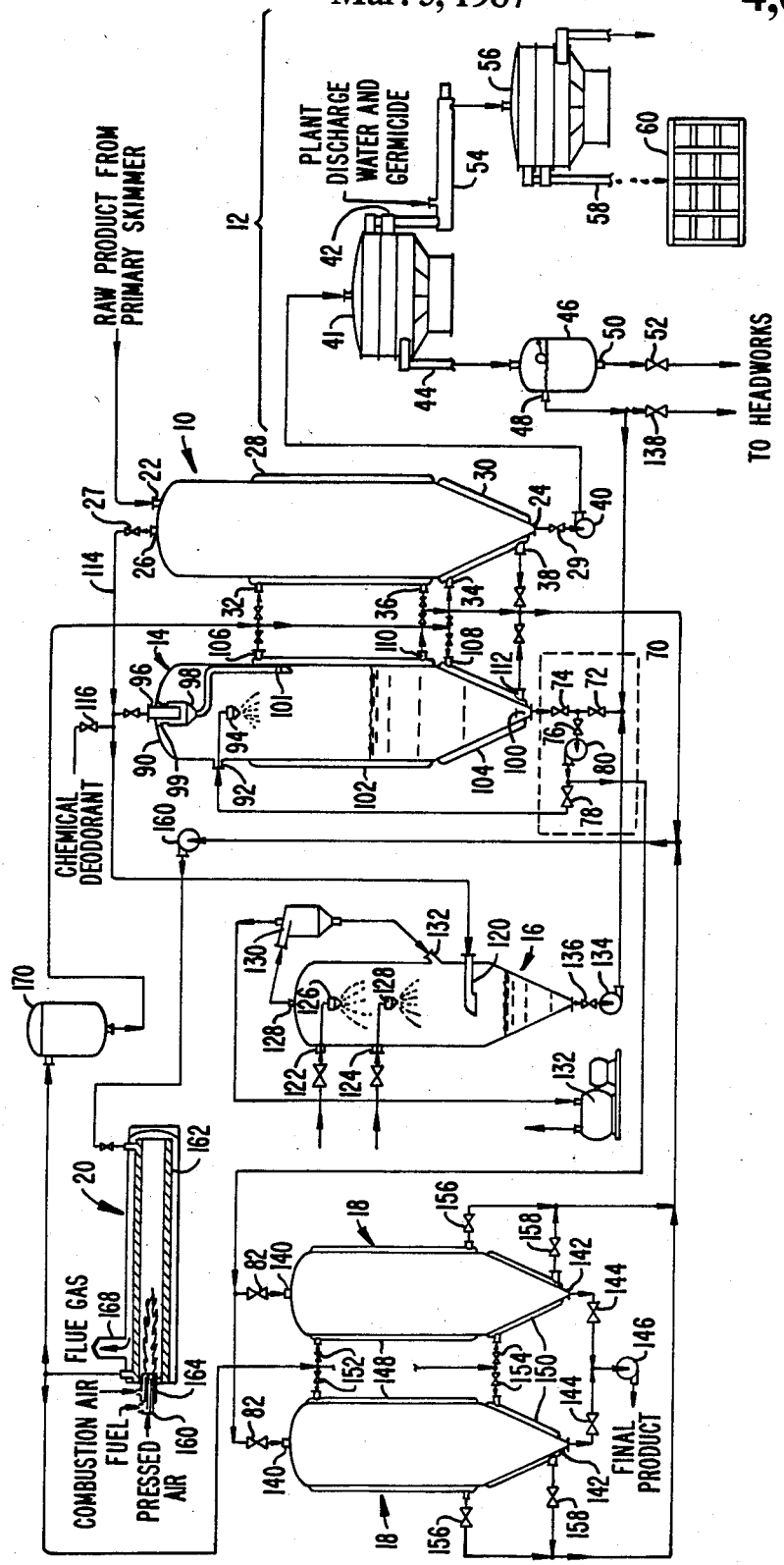
FIG.—1.

APPARATUS AND METHOD FOR PROCESSING SEWAGE SCUM

BACKGROUND OF THE INVENTION

This invention relates to an apparatus and method for processing sewage scum; in particular, the invention relates to an apparatus and method for processing the collected primary skimmings, for example, from wastewater treatment plants. The purpose of this process is to separate and treat the solids portion of these skimmings so that they are acceptable for ordinary landfill disposal, to separate and treat the fats and oils portion of the skimmings for sale as a raw product for distillation, and to return the oil and solid-free water back into the treatment plant influent.

One of the first steps in the treatment of municipal sewage or raw sewage from other sources is skimming an upper layer from the raw sewage for disposal prior to treating the sewage for discharge, by flocculation, aerobic digestion, or other techniques. Typically, a layer of scum rises to the surface of the raw sewage when it is, for example, held in a settling tank or basin. This scum is typically skimmed from the surface of the raw sewage for separate treatment to prevent interference by the materials in the scum with treatment processes applied to the remainder of the sewage. Removal of this scum layer is typically accomplished with a primary skimmer. The scum thus removed from the raw sewage typically contains about 70% water, about 15% plastics and other solids, and about 15% fats, oils, and other oily substances. Until recently, the scum removed from the raw sewage in this way was either disposed of by dumping or landfilling the scum, possibly after the removal of the aqueous component of the scum, or by drying and incinerating or burning the scum.

With increased interest in the environment and increased regulatory requirements for pollution abatement equipment, such methods of scum disposal are no longer practicable. Dumping or landfilling of scum is undesirable due to the potentially harmful environmental consequences, the continually increasing high cost of landfilling, and the increasingly limited locations in which such disposal is permitted. Burning of dewatered scum is possible, but, because of the very high incinerator temperatures that are required to completely combust the plastics typically found in sewage scum, burning of large quantities of scum in a way that will meet regulatory requirements is generally infeasible.

SUMMARY OF THE INVENTION

A method and apparatus for processing sewage scum are disclosed. The sewage scum processor apparatus preferably includes a scum cooker, a solids separation system, a vacuum dryer, a condenser, and product storage tanks. The scum cooker, or cooking tank, heats the sewage scum obtained, for example, from a primary skimmer of a sewage treatment plant, by maintaining the raw sewage scum at an elevated temperature and elevated pressure to liquify and sterilize the raw scum and render the raw scum separable into its solid, aqueous, and oily components. The solid separation system removes the solid and particulate matter from the thus liquified scum for disposal, preferably after washing the solids with treated water from the sewage treatment plant and a germicide. The solid-free liquified scum is then transferred to the vacuum dryer. The vacuum dryer is maintained at an elevated temperature and preferably at least a moderate vacuum to remove the water and other volatiles from the fluid components of the liquified scum. The volatile components of the liquified scum (which include water vapor) removed with the vacuum dryer are condensed in the condenser and returned to the sewage treatment plant to be processed with the remainder of the sewage. Preferably, in the condenser, the water and volatiles are washed and cooled with treatment plant effluent and deodorized by injection of a deodorizing chemical. The non-condensable components of the liquified sewage scum are then released to the atmosphere, preferably following treatment with a deodorizing chemical. The oily components of the processed sewage scum collected in the vacuum dryer are preferably stored for ultimate disposition in a heated storage tank; the storage tank is heated to prevent solidification of any of the oily substances and to maintain a relatively low viscosity.

Preferably, the scum cooker, vacuum dryer, and storage tank are heated with a heated exchange fluid, such as a high temperature oil, cycled through a heat exchanger. In the heat exchanger, the exchange fluid is heated to the desired elevated temperature with a burner utilizing, for example, diesel fuel. In alternative embodiments of the invention, other heat sources could be used, including arrangements in which separate heat sources are used to heat the scum cooker, vacuum dryer, and storage tanks.

The cleaned and purified fat and oil component of the sewage scum can, following the process of the present invention, be recycled for use as fuel oil or otherwise sold. The recovered fats and oils can also be distilled for disposition of specific fractions of the mixture according to their intended use.

The solids that are extracted from the sewage scum according to the process of the present invention may be landfilled safely and inexpensively due to the treatment according to the present process and the relatively low volume of the extracted solids. The water and aqueous fractions removed by the process of the present invention can be returned to the sewage treatment plant for processing with the raw sewage that remains after removal of the scum with the primary skimmer.

In addition, the apparatus disclosed is relatively inexpensive to operate; the primary expense is for fuel for heating the cooker, vacuum dryer, and storage tanks. The process is also non-polluting.

Following treatment of the sewage scum using the present invention, it is necessary to dump or landfill only about 10%–15% of the amount of scum which would have to have been so disposed of without the use of the invention. This 10%–15% will be inert water wet solids which are compatible with any municipal landfill operation.

BRIEF DESCRIPTION OF THE DRAWING

FIG. 1 is a schematic drawing of the processor of the invention.

DETAILED DESCRIPTION OF THE PREFERRED EMBODIMENT

The preferred embodiment of the invention, shown schematically in FIG. 1, has a cooking tank 10 for liquifying and sterilizing the raw sewage scum and rendering the raw scum separable into solid, aqueous, and oily components, a solids separation system 12 for separating the plastics and other solids from the aqueous and oily phases of the liquified scum, a vacuum dryer 14 for removing water and other volatiles from the combined aqueous and oily phases, a condenser 16 for liquefying water and other volatiles removed in the vacuum dryer, and storage tanks 18 for storing the dried and treated oily phase pending final disposition of the recovered fats and oils. The preferred embodiment also includes a heat exchanger 20 for providing heat to cooking tank 10, vacuum dryer 14, and storage tanks 18. In alternative embodiments of the invention, however, other heat sources could be used, such as arrangements for individually heating cooking tank 10, vacuum dryer 14, and storage tanks 18.

Cooking tank 10 is provided with an inlet 22 for introduction of raw scum from the primary skimmer of a sewage treatment system. Typically, the raw scum includes about 70% aqueous components, about 15% fats and oils, and about 15% plastics and other solids; however, without further treatment, the scum mixture is not readily separable into its component parts. Treatment of the raw scum from the primary skimmer in cooking tank 10 renders the scum to enhance the separability of the solids, the oily phase, and the aqueous phase of the scum; this treatment also sterilizes the scum.

Cooking tank 10 also includes a liquified scum outlet 24, a gas relief outlet 26 equipped with a high pressure relief valve 27, and exchange fluid circulating jackets 28 and 30. Preferably, cooking tank 10 is a cylindrical tank having a conical lower end for efficient drainage of tank 10. Other designs and shapes suitable for cooking tank 10 are well known; alterations in tank design will require appropriate changes in the design of circulating jackets 28 and 30, which are formed to adapt to the particular shape of cooking tank 10. Drainage of tank 10 into solid separator 12 through liquified scum outlet 24 is controlled by outlet valve 29.

During the heat and pressure treatment of the raw scum from the primary skimmer of the sewage treatment system, substantial quantities of gas are evolved. Excess gas and pressure are released through gas relief outlet 26; the elevated pressure is maintained in the cooking tank 10 by high pressure relief valve 27, which is adjustable to maintain the desired pressure in tank 10. Typically, tank 10 is maintained at an elevated pressure of about 25 psi (pounds per square inch) during this stage of the scum treatment process.

Cooking tank 10 is maintained at an elevated temperature of about 200° F. (95° C.), preferably with a heated exchange fluid circulated through circulating jackets 28 and 30. Other temperatures may be used as long as the temperature is sufficiently high to sterilize and render the scum. These jackets 28 and 30 are in thermal contact with, are conformed to the exterior of, and cover most of the external surface area of, cooking tank 10. The exchange fluid, which will be described more fully below, is received from heat exchanger 20 into jackets 28 and 30 via inlets 32 and 34. The cooled exchange fluid is returned to heat exchanger 20 via outlets 36 and 38.

Following rendering and sterilization of the scum in cooking tank 10, the liquified scum is forwarded to solids separation system 12 using pump 40. Suitable pumps 40 for forwarding the heated slurry output of tank 10 to solids separation system 12 are well known.

Solids separation system 12 includes a solids separator 41 which substantially separates the scum solids from the aqueous and oily components of the liquified scum. The separated solids, which may be a sludge-like material, are produced at an outlet 42 for disposal or further processing, while the combined aqueous and oily phases of the liquified scum are removed from solids separator 41 through a fluids outlet 44. Solid separator 41 is of a conventional design, such as that described in U.S. Pat. Nos. 3,773,661 or 3,707,235. Suitable substitutes for solid separator 41 are well known.

Since the rate of output of fluids from solids separator 41 through fluid output 44 may be uneven, a surge tank 46 is provided between fluid output 44 of solids separator 41 and vacuum dryer 14. Surge tank 46 is equipped with an overflow outlet 48 and a drain 50; overflow outlet 48 provides a relatively even flow of fluids to vacuum dryer 14. Excess aqueous phase may be drained from surge tank 46 through drain 50 and returned to the main sewage treatment plant controllably with valve 52. All free bottom water can be drained through 50 back into treatment plant influent following solids removal. When aqueous phase becomes oily, the flow is diverted through outlet 48 into the vacuum dryer.

Using the remaining components of solids separation system 12 shown in FIG. 1, the solids produced by solids separator 41 are preferably washed with sewage treatment plant discharge water prior to disposal of the solids, although this is not necessary to the practice of the invention. Water, preferably together with a germicide such as chlorine for further sterilization, is mixed with the solids in a mixing screw conveyor 54 connected to outlet 42 of solids separator 41. The resulting slurry is introduced to a second separator 56, which conveniently is of the same type as solids separator 41. The solids produced by separator 56 through outlet 58 are collected in a disposal container 60 in a form suitable for ultimate disposal. Liquids obtained from separator 56 are returned to the sewage treatment plant.

Fluid communication between surge tank 46, vacuum dryer 14, condenser 16, and storage tanks 18 is controlled by flow network 70. Flow network 70 includes, in the preferred embodiment of the invention, four valves 72, 74, 76, and 78, and a pump 80. With valves 72, 74, and 80 open and valve 74 closed, pump 80 forwards fluid from surge tank 46 to vacuum dryer 14; for this operation, fluid is prevented from entering storage tanks 18 by valves 82, discussed below. When valves 74, 76, and 78 open and valve 72 is closed, partially dried fluid from vacuum dryer 14 or condensate from condenser 16 may be recycled through vacuum dryer 14 for further drying. Satisfactorily dried fluid may be forwarded to storage tanks 18 by opening valves 74 and 76 and closing valves 72 and 78.

As flow network 70 is shown in FIG. 1, flow network 70 is particularly adapted to processing of batches of raw sewage scum. That is, for example, the non-volatile phase collected in vacuum dryer 14 cannot be transferred to storage tanks 18 simultaneously with the transfer of condensate from condenser 16 to the sewage treatment plant headworks via valve 138. However, as will be apparent to those skilled in the art, a more complex flow network 70 could be substituted for that shown in FIG. 1 for substantially continuous operation of the sewage scum processor according to the invention.

Vacuum dryer 14 includes a vacuum tank 90, which is conveniently approximately equivalent to cooking tank 10. Vacuum tank 90 is equipped with an inlet 92 and a sprayer 94, a vapor outlet 96 communicating with the interior of vacuum tank 90 through a demister 98, and a liquid outlet 100. Vacuum dryer 14 also includes heating jackets 102 and 104 having inlets 106 and 108 and outlets 110 and 112 coupled to heat exchanger 20 with suitable valves and conduits. Heating jackets 102 and 104 are substantially equivalent in both structure and function to circulating jackets 28 and 30, discussed above.

Sprayer 94 disperses the fluid received into vacuum dryer 14 from surge tank 46 through inlet 92 for enhanced evaporation of the volatile components of the combined aqueous and oily phases of the liquified scum. The volatile components of the liquid received into vacuum dryer 14 are removed via vapor outlet 96. Since the vapors withdrawn from vacuum dryer 14 typically include small droplets of liquid or mist from the sprayer, the vapor is preferably directed through demister 98; the volatile fractions and some liquid mist enter demister 98 through demister inlets 97. The mist or droplets are there collected for return to vacuum dryer 14 via return pipe 101. The volatilized fractions of the liquid are removed from vacuum dryer 14 through a vacuum outlet valve 96 to condenser 16. The dried non-volatile fractions may be withdrawn through liquid outlet 100 and forwarded to storage tanks 18 or recycled to vacuum dryer 14 via flow network 70, as discussed above.

Vacuum dryer 14 is preferably maintained at at least about 200° F. (95° C.) by the heated exchange fluid circulating through jackets 102 and 104; at such a temperature, water has a sufficiently high vapor pressure to be readily removed to a high degree of effectiveness. As water and other volatiles are removed from the fluid introduced to vacuum dryer 14, the heat supplied through jackets 102 and 104 causes the temperature in vacuum dryer 14 to rise to as much as about 250° F. (120° C.), enhancing the removal of the remaining water and volatile components from the fluid. Vacuum dryer 14 is preferably maintained at a pressure of between about 15 and 25 inches of mercury, and most preferably at about 22 inches of mercury (0.65 atmosphere).

The water and other volatile substances, removed from the combined aqueous and oily phases of the sewage scum, are transferred to condenser 16 through vacuum line 114. Vacuum line 114 preferably also receives gases released through high pressure relief valve 27 from cooking tank 10. A chemical deodorant, such as caustic soda, may be added to vacuum line 114 through valve 116 prior to reception into condenser 16.

Condenser 16 is maintained at an ambient temperature so that the condensable volatiles received into condenser 16 through manifold 120 are collected in condenser 16. Condenser 16 is also provided with inlets 122 and 124 and sprayers 126 and 128 for spraying the vapors and condensate with a chemical deodorant and a water rinse, respectively. Preferably, the chemical deodorant is caustic soda; suitable alternatives are well known. Water for washing the condensate and increasing the efficiency of condensation is conveniently derived from the treated water discharge from the sewage treatment plant.

Non-condensable gases and some mist are withdrawn from condenser 16 through outlet 128; passage of these vapors through a trap 130 isolates the non-condensable gases for removal to the atmosphere via vacuum pump 132. Condensable materials and mists or droplets are collected in trap 130 and returned to condenser 16 via return inlet 132. Trap 130 is preferably a cold trap, such as a tube type heat exchanger cooled with plant water; suitable substitutes will be apparent to those skilled in the art. Vacuum pump 132 is a liquid ring pump in the preferred embodiment.

Condensate collected in condenser 16 is removed through pump 134 controllably with a valve 136. The condensate can return through flow network 70, as discussed above, to the sewage treatment plant via a valve 138.

The non-volatile fractions of the combined aqueous and oily phases of the sewage scum, trapped in the lower portion of vacuum dryer 14, constitute the recovered, processed fats and oils; these are removed through flow network 70 to storage tanks 18. This recovered, processed oil is received into tanks 18 through valves 82 and inlets 140. The recovered oil can be held in storage tanks 18 until it can be conveniently removed for its ultimate disposition. Removal is accomplished through storage outlets 142 via valves 144 and a pump 146. To avoid partial solidification of the oils and fats recovered, storage tanks 18 are provided with jackets 148 and 150 through which a heated exchange fluid from heat exchanger 20 is circulated in much the same manner as in circulating jackets 28, 30, 102, and 104. Preferably, the heated exchange fluid is received into jackets 148 and 150 through jacket inlets 152 and 154, and removed for reheating through jacket outlets 156 and 158.

The heat exchanger system for maintaining cooking tank 10, vacuum dryer 14, and storage tanks 18 at elevated temperatures includes, in addition to circulating jackets 28, 30, 102, 104, 148, and 150 discussed above, heat exchanger 20 and a pump 160 for circulating the exchange fluid through heat exchanger 20.

Heat exchanger 20 preferably utilizes a flame jet to heat the exchange fluid to the desired temperature of about 350° F. In the apparatus according to this invention, a heat exchanger with a capacity of about 2.5 million BTU has been found to be satisfactory. The exchange fluid is circulated in thermal contact with the flame through a jacket 162 and thence to cooking tank 10, vacuum dryer 14, and storage tank 18. The fuel burned in heat exchanger 20 is preferably diesel fuel or natural gas, but other suitable substitutes are well known. Efficient and appropriate designs for jacket 162 within heat exchanger 20 will also be well known to those skilled in the art.

Air and fuel for burning within heat exchanger 20 are received into and burned using burner 164. Preferably, the flame is directed along the length of the interior of jacket 162 with a stream of compressed air received in burner 164 via compressed air inlet 166. The exhausted gases from vacuum pump 132 can conveniently provide a source of compressed air for introduction into compressed air inlet 166. The combustion products of the flame are removed to the atmosphere via a flue 168.

Preferably, the heated exchange fluid may be stored in a reservoir 170 for circulation through the various jackets of cooking tank 10, vacuum dryer 14, and storage tanks 18. Reservoir 170 also acts as an expansion chamber for the heat exchanger and associated circulating jackets and tubing.

The exchange fluid circulated through heat exchanger 20 and the associated conduits and circulating jackets is preferably a high temperature oil, such as Dow Therm ®, manufactured by Dow Chemical Company.

The temperatures maintainable in cooking tank 10, vacuum dryer 14, and storage tank 18 will depend on a variety of factors, including the length and insulation of the conduits in the heat exchanger system, the geometry and efficiency of heat transfer in heat exchanger 20, the quantity and rate of fuel combustion in burner 164, the rate of circulation of the exchange fluid through the system by pump 160, and other factors. As will be apparent to those skilled in the art, adjustment of some of these factors, especially the rate of fuel combustion, will allow the adjustment of the temperatures within cooking tank 10, vacuum dryer 14, and storage tanks 18 to the desired temperatures.

As used in this specification and the appended claims, the term "fats and oils" includes non-particulate portions of the rendered scum which are substantially fat- or oil-soluble and are non-volatile under the conditions obtaining in the above-described vacuum dryer 14. The term "oily phase" denotes that portion of the liquified scum remaining after removal of solids and free water from the liquified scum which is substantially hydrophobic and those components of the rendered scum which are substantially soluble in fats or oils.

While the above is a complete description of the preferred embodiment of the invention, other arrangements and equivalents are possible and may be employed without departing from the true spirit and scope of the invention. For example, the sizes and configurations of most of the components of the preferred embodiment, in particular of the cooking tank 10, vacuum dryer 14, and storage tanks 18 may be varied considerably. Similarly, the number and positioning of the tanks of each type is not critical. Therefore, the above description and illustration should not be construed as limiting the scope of the invention which is delineated by the appended claims.

What is claimed is:

1. A sewage scum processor comprising:
    cooking means for maintaining raw sewage scum at an elevated temperature to render the scum separable into aqueous, solid, and oily phases, the cooking means including an inlet for receiving the raw scum, a liquified scum outlet for discharging liquified scum from the cooking means, and a gas outlet for removing gases escaping from the scum;
    separator means, coupled to the liquified scum outlet, for receiving liquified scum from the cooking means and for separating solids from the aqueous and oily phases of the scum;
    vacuum drying means fluidly coupled to the separator means for receiving and separating the aqueous and oily phases into a volatile phase and a non-volatile phase, the vacuum drying means including a non-volatile phase outlet and a gas vapor outlet for removal of the volatile phase;
    condenser means fluidly coupled to the gas vapor outlet for condensing at least a portion of the volatile phase received from the vacuum drying means to form a condensate; and
    storage means, fluidly coupled to the vacuum drying means, for maintaining the non-volatile phase at a raised temperature.

2. The processor of claim 1 wherein the cooking means includes a heat source and the vacuum drying means is operably coupled to the heat source to maintain the vacuum dryer means at an elevated temperature.

3. The processor of claim 1 including a heat exchanger for heating an exchange fluid and circulating the exchange fluid through a closed path to heat each of the cooking means, the vacuum drying means, and the storage means.

4. The processor of claim 3 wherein the cooking means, the vacuum drying means, and the storage means each includes jacketing means for circulating therethrough the heated exchange fluid and returning the exchange fluid to the heat exchanger.

5. The processor of claim 3 wherein the exchange fluid is heated with a fuel burner.

6. The processor of claim 1 wherein the separator means further comprises a surge tank for separating a substantial portion of the aqueous phase from the oily phase prior to reception of the oily phase into the vacuum drying means.

7. The processor of claim 1 wherein the vacuum drying means comprises:
    a vacuum tank;
    a jacket for circulating heated exchange fluid;
    an inlet and sprayer for introducing the aqueous and oily phases into the vacuum tank; and
    an outlet communicating with the condenser means through a vacuum line.

8. The processor of claim 7 wherein the cooking means includes a heat exchanger means for supplying heated exchange fluid to the cooking means and to the vacuum drying means jacket.

9. The processor of claim 1 wherein the condenser means includes:
    means for deodorizing the volatile phase; and
    means for washing the volatile phase.

10. The processor of claim 1 wherein the cooking means comprises:
    a cooking tank having an inlet for receiving raw scum and a gas outlet for transferring gases escaping from the scum through a vacuum line to the condenser means; and
    a jacket for circulating heated exchange fluid, the jacket being in thermal communication with the cooking tank; and
    wherein the elevated pressure is about 25 psi and the elevated temperature is above about 200° F.

11. A sewage scum processor comprising:
    a cooking tank for maintaining the raw sewage scum at an elevated temperature to render the scum separable into aqueous, solid, and oily phases, the cooking tank having an inlet for receiving raw scum, a liquified scum outlet for discharging liquified scum from the cooking tank, a gas outlet for removing gases escaping from the scum, and a jacket for circulating a heated exchange fluid to heat the cooking tank to a cooking temperature;
    a solids separator, coupled to the liquified scum outlet, for receiving liquified scum from the cooking tank and for separating solids from the aqueous and oily phases of the scum;
    a vacuum dryer fluidly communicating with the separator means for reception of the aqueous and oily phases and operable to separate the aqueous and oily phases into a volatile phase and a non-volatile phase, the vacuum dryer having a vacuum tank, a jacket for circulating heated exchange fluid, an inlet for receiving the aqueous and oily phases into the vacuum tank, a gas vapor outlet for removal of the volatile phase, and a non-volatile phase outlet;
    a condenser coupled to the vapor outlet of the vacuum dryer for reception of the volatile phase, the condenser including a sprayer for spraying the volatile phase with a deodorizing chemical, a sprinkler for washing the volatile phase with water, and a discharge outlet for discharging condensable portions of the volatile phase;

a storage tank for reception of the dried non-volatile phase coupled to the non-volatile phase outlet and operable to maintain the received non-volatile phase at a storage temperature; and a heat exchanger for heating an exchange fluid and circulating the heated exchange fluid through a closed path to heat each of the cooking tank, the vacuum dryer, and the storage tank.

12. A method of processing sewage scum comprising the steps of:

cooking the scum at an elevated temperature to render the scum separable into a solid phase, an oily phase, and an aqueous phase;

separating the solid phase from the oily phase and the aqueous phase;

removing a volatile phase from the aqueous phase and the oily phase by heating the oily phase and the aqueous phase at a reduced pressure;

condensing a substantial portion of the volatile phase;

vacuum drying the non-volatile phase; and storing the non-volatile phase at a storage temperature.

13. The method of claim 12 further comprising the step of heating the scum, the aqueous and oily phases, and the stored non-volatile phase with a circulating heated exchange fluid.

14. The method of claim 12 further comprising the steps of:

washing the volatile phase;

deodorizing the volatile phase with a deodorizing chemical; and releasing uncondensable portions of the washed and deodorized volatile phase.

15. The method of claim 12 further comprising the steps of:

washing the separated solid phase by the addition of water and a germicide to the separated solid phase to form a slurry; and separating solids from the slurry for disposal as substantially pathogen-free water wet solids.

16. A method of processing sewage scum comprising the steps of:

cooking the scum at a cooking temperature to render the scum separable into a solid phase, an oily phase, and an aqueous phase, the cooking temperature being maintained with a circulating, heated exchange fluid;

separating the solid phase from the oily phase and the aqueous phase;

washing the separated solid phase by adding water and a germicide to the separated solid phase to form a slurry;

separating solids from the slurry for disposal;

removing a volatile phase from the aqueous phase and the oily phase by heating the oily phase and the aqueous phase with a circulating heated exchange fluid at a reduced pressure;

washing the volatile phase with a water sprayer;

deodorizing the volatile phase with a sprayed deodorizing chemical;

condensing a substantial portion of the volatile phase;

releasing uncondensed portions of the washed and deodorized volatile phase; and storing the non-volatile phase.

* * * * *